Patented Nov. 19, 1940

2,221,771

UNITED STATES PATENT OFFICE 2,221,771

ETHERS OF CHLOROPHENOLS

Francis N. Alquist and Harold R. Slagh, Midland, Mich., assignors to The Dow Chemical Company, Midland, Mich., a corporation of Michigan No Drawing. Application August 17, 1938, Serial No. 225,420

3 Claims. (Cl. 260—348)

This invention relates to the ethers of the chlorophenols, and is particularly concerned with those compounds having the formula

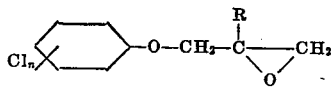

wherein R represents hydrogen or methyl, and $n$ is an integer not greater than 5. These compounds are high-boiling materials substantially insoluble in water, and somewhat soluble in most organic solvents. They have been found particularly valuable as fly spray toxicants.

In preparing the above new compounds, we generally form an aqueous solution of an alkali metal salt of a chloro-phenol and add this portion-wise to a molecular excess of 1-chloro-propylene-oxide-2,3 or 1-chloro-2-methyl-propylene-oxide-2,3 with stirring at temperatures between 60° C. and the refluxing temperature of the reaction mixture. The mixture is thereafter warmed until the reaction is substantially complete, cooled, and the crude ether product separated as by extraction, decantation, filtration, etc. Upon fractional distillation of the crude product, the desired chloro-phenyl ether is obtained in substantially pure form.

An alternate procedure for the preparation of a 1-(halo-phenoxy)-2-methyl-propylene-oxide-2,3 consists of reacting an aqueous solution of the sodium salt of a chloro-phenol with 1.3-dichloro-tertiarybutyl alcohol to form a 1-(chloro-phenoxy)-3-chloro-tertiarybutyl alcohol, and subsequently treating this compound with concentrated sodium hydroxide solution to split out hydrogen chloride and form the desired 2-methyl-propylene-oxide-2,3 ether derivative.

The following examples describe in detail the preparation of certain individual members of our new class of compounds, but are not to be construed as limiting the invention.

*Example 1*

64.5 grams (0.5 mole) of 4-chlorophenol was dissolved in 121 grams of aqueous caustic containing 0.5 mole of sodium hydroxide. This solution was added portion-wise with stirring to 69.5 grams (0.75 mole) of 1-chloro-propylene-oxide-2,3 over a period of one hour at temperatures gradually increasing from 60° to 70° C. The reaction mixture was held at 60°–70° C. for an additional hour. 50 milliliters of water was then added thereto and the mixture cooled, whereupon a crude ether product separated out as a water-immiscible layer. This layer was separated by decantation and fractionally distilled, whereby there was obtained 62 grams of 1-(4-chloro-phenoxy)-propylene-oxide-2,3 as a viscous liquid boiling at 137° C. at 0.25 inch pressure. Upon standing, this compound solidified and was found to have a freezing point of 29° C.

*Example 2*

133.3 grams (0.5 mole) of pentachlorophenol, 21 grams (0.5 mole) of 95 per cent sodium hydroxide, 400 milliliters of water, and 69.5 grams (0.75 mole) of 1-chloro-propylene-oxide-2,3 were reacted together substantially as described in the preceding example. Upon cooling of the reaction mixture, the crude ether product precipitated from solution. This precipitate was recovered by filtration and recrystallized from alcohol, whereby there was obtained 141 grams of 1-(pentachloro-phenoxy)-propylene-oxide-2,3 as a white powder, melting at 116° C. and containing 55.6 per cent chlorine, compared to a theoretical chlorine content of 55.1 per cent.

*Example 3*

A solution of 144 grams (0.5 mole) of sodium pentachlorophenolate in 400 milliliters of water was added portion-wise with stirring to 94.5 grams (0.6 mole) of 1.3-dichloro-tertiarybutyl-alcohol at 50° C. over a period of one hour. The reaction mixture was then stirred and heated at temperatures gradually increasing at 50° to 80° C. for one hour and thereafter cooled to room temperature. A solution of 23 grams of sodium hydroxide in 50 milliliters of water was added to the above product at 50° C. over a period of 30 minutes. The mixture was then heated to 80° C. for one hour and cooled. The reaction product consisted in a slurry of the desired ether compound in aqueous suspension. This slurry was filtered and the residue washed with water and dried, whereby there was obtained 144 grams of 1-pentachloro-phenoxy)-2-methyl-propylene-oxide-2,3 as a white powder melting at 112° C. upon recrystallization from ethyl alcohol.

In a similar manner, the corresponding ethers of 2-chloro-phenol, 3-chlorophenol, 2.4-dichloro-phenol, 2.5-dichlorophenol, 2.4.5-trichlorophenol, 2.4.6-trichlorophenol, and 2.4.5.6-tetrachloro-phenol may be prepared. These compounds are, for the most part, crystalline in nature although certain of the lower molecular weight derivatives are obtained as viscous liquids having a tendency to solidify on standing.

Petroleum distillate solutions of the above ether compounds have been found of value as fly spray materials. For example, a 3 per cent solution of 1-(pentachloro-phenoxy)-propylene-oxide-2,3 in kerosene, when tested by the Peet-Grady method, substantially as described in Soap, 8, No. 4, 1932, was found to give better than a 63 per cent knockdown of three-day old house flies and a kill of over 42 per cent in 24 hours.

We claim:
1. A compound having the formula
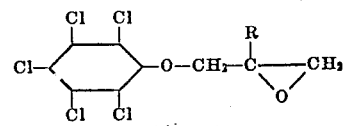
wherein R represents a member of the group consisting of methyl and hydrogen.
2. 1-(pentachloro-phenoxy)-propylene-oxide-2,3.
3. 1-(pentachloro-phenoxy)-2-methyl-propylene-oxide-2,3.
FRANCIS N. ALQUIST.
HAROLD R. SLAGH.